(12) United States Patent
Segletes et al.

(10) Patent No.: US 7,108,483 B2
(45) Date of Patent: Sep. 19, 2006

(54) COMPOSITE GAS TURBINE DISCS FOR INCREASED PERFORMANCE AND REDUCED COST

(75) Inventors: David Scott Segletes, Oviedo, FL (US); Michael John Hoelzel, Charlotte, NC (US)

(73) Assignee: Siemens Power Generation, Inc., Orlando, FL (US)

( * ) Notice: Subject to any disclaimer, the term of this patent is extended or adjusted under 35 U.S.C. 154(b) by 75 days.

(21) Appl. No.: 10/885,989

(22) Filed: Jul. 7, 2004

(65) Prior Publication Data

US 2006/0008352 A1    Jan. 12, 2006

(51) Int. Cl.
 *F01D 5/02* (2006.01)
(52) U.S. Cl. ............... 416/213 A; 416/244 A

(58) Field of Classification Search ............ 416/244 A, 416/248, 213 R, 234
See application file for complete search history.

(56) References Cited

U.S. PATENT DOCUMENTS 5,746,579 A     5/1998   Amos et al.
6,085,417 A  *  7/2000   Anderson et al. ....... 416/213 A

* cited by examiner

*Primary Examiner*—Edward K. Look
*Assistant Examiner*—Richard A. Edgar

(57) ABSTRACT

A composite turbine disc includes a high nickel rim section and a steel bore section. The rim section is formed from a high nickel alloy which provides a higher melting point as compared to the material used for the bore section. A plating or forged welding enhanced agent layer is disposed between the bore section and rim section. Composite disc can be formed by forging the rim and bore material together, or by welding the rim and bore material together.

7 Claims, 1 Drawing Sheet

COMPOSITE GAS TURBINE DISCS FOR INCREASED PERFORMANCE AND REDUCED COST

FIELD OF THE INVENTION

This invention relates generally to the field of power generation and more specifically to discs for gas turbine engines and jet engines.

BACKGROUND OF THE INVENTION

Gas turbine engines include a compressor section for supplying a flow of compressed combustion air, a combustor section for burning a fuel in the compressed combustion air to produce thermal energy, and a turbine section for converting the thermal energy into mechanical energy in the form of a shaft rotation. Many parts of the combustor section and turbine section are exposed directly to hot combustion gasses. For example, the combustor, the transition duct between the combustor and the turbine section, and the turbine stationary vanes, discs and rotating blades are all exposed to hot combustion gases.

It is also known from basic thermodynamics that increasing the firing temperature of the combustion gas may increase the power and efficiency of a combustion turbine. Modern high efficiency combustion turbines have firing temperatures that may be well in excess of the safe operating temperature of the structural materials used to fabricate the hot gas flow path components. Special super alloy materials have been developed for use in such high temperature environments.

These materials have been used with specific cooling arrangements, including film cooling, backside cooling and insulation. Super alloys are well known in the art of power generation. Super alloys are based on Group VIIIB elements and usually consist of various combinations of Fe, Ni, Co, and Cr, as well as lesser amounts of W, Mo, Ta, Nb, Ti, and Al. The three major classes of super alloys are nickel-based, iron-based, and cobalt-based alloys. Nickel-based super alloys can be either solid solution or precipitation strengthened. Solid solution strengthened alloys are used in applications requiring only modest strength.

A precipitation-strengthened alloy is required in the most demanding applications such as the hot combustion gas flow path sections of gas turbine engines. The primary strengthening phase in nickel-based super alloys is $Ni_3(Al, Ti)$, which is referred to as gamma prime. A characteristic of the gamma prime strengthened nickel-based super alloys is that they retain their strength at elevated temperatures and may be used in load-bearing structures to the highest homologous temperature of any common alloy system, being useful up to about Tm=0.9, or 90% of their melting point.

Although nickel-based alloys are commonly used as the material for aircraft engine discs, application of these materials in industrial gas turbines results in significant technical problems as well as increased costs. For example, the manufacture of large industrial gas turbine discs via the conventional cast/wrought processing route is difficult. The starting ingots are already at their size limit for the avoidance of unacceptable segregation related defects, thus limiting the choice of available alloys. The number of presses with sufficient capacity to forge such discs is also extremely small.

U.S. Pat. No. 5,746,579 to Amos et al. disclose a formed disc for use in a low pressure steam rotor which has a corrosion resistant rim made of a steel composition including between approximately 9% and 17% chromium. The rim can be annular in shape and slide onto the perimeter of an unformed steel disc for the two components to be fused together, thus fabricating a formed disc. Although the composite discs disclosed by Amos et al. are effective at preventing stress corrosion cracking, the disc composition is not high temperature capable, such as required for use in gas turbine engines and jet engines.

SUMMARY OF THE INVENTION

The invention provides a new and economical method for the manufacture of large high performance mixed material turbine discs. Discs according to the invention significantly reduce the alloy costs associated with nickel-based discs and also significantly reduce the above-described manufacturing difficulties.

A composite turbine disc includes a high nickel rim section and a steel bore section. The rim section is formed from a high nickel alloy which provides a substantially higher melting point as compared to the material used for the bore section. A plating, forged welding enhanced agent, or weld filler comprising intermediate layer is disposed between the bore section and rim section. The composite disc can be formed by forging the rim and bore material together, or by welding the rim and bore material together.

Using the forging method, the intermediate layer can comprise a layer of nickel or a forge welding enhanced agent. Using the welding method, the intermediate layer can be a welding filler comprising layer admixed with the bore material adjacent to the bore section and the rim material adjacent to the rim section and thus be considered to not be present as a separate and distinct layer.

The high nickel alloy can be a super alloy material, such as having 35% to 60% nickel. The bore section can comprise steel.

A method of fabricating composite turbine discs includes the steps of forging a ring from a high nickel alloy material, providing a steel comprising ingot, and placing the ring over the ingot. The method can include the step of forging a preform, wherein the preform comprises the ring concentric with and surrounding the ingot. In the forging method, the method can include the step of plating the ingot with a plating layer, such as a Ni layer, before the placing step.

In an alternate embodiment, the method includes the step of joining the ring to the ingot with a welding filler material using a process comprising welding.

BRIEF DESCRIPTION OF THE DRAWINGS

A fuller understanding of the present invention and the features and benefits thereof will be accomplished upon review of the following detailed description together with the following accompanying drawing, in which.

DETAILED DESCRIPTION OF THE INVENTION

Figure 1:
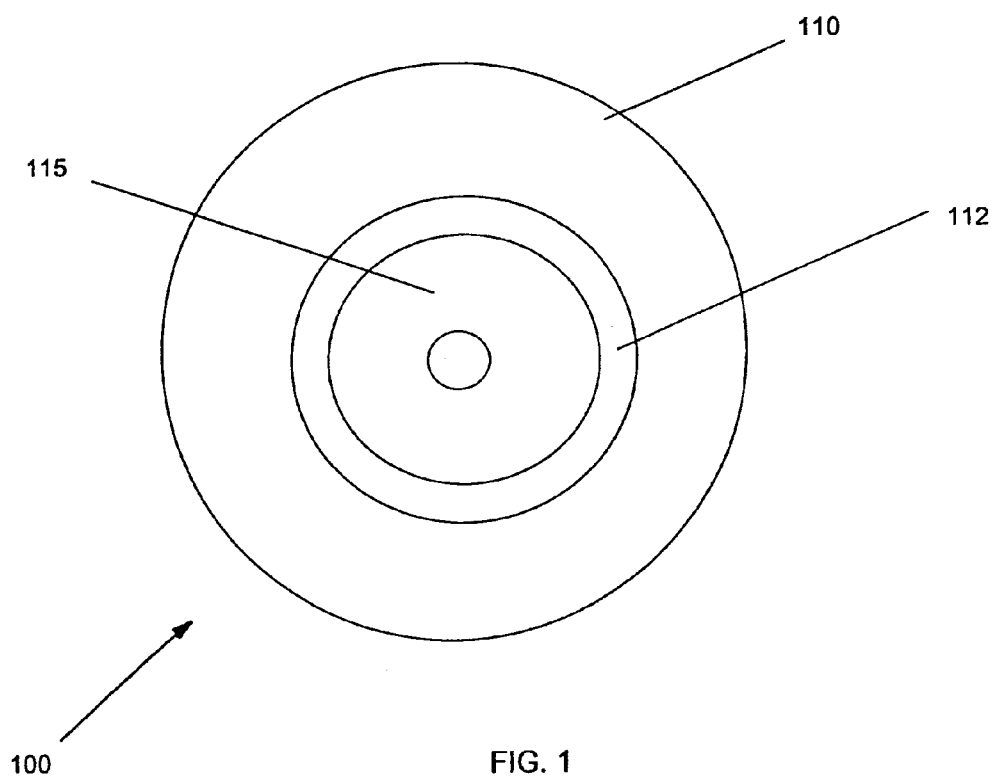
FIG. 1 is a top view of a composite disc having a high nickel alloy rim section and a low cost alloy bore section, according to an embodiment of the invention.

A composite turbine disc includes a bore section which provides a first melting point, and a rim section comprising a high nickel alloy which provides a higher melting point as compared to the bore section. The invention thus provides composite discs which combine the high strength, toughness, and low cost of low alloy steels in the bore section with the high strength, creep resistance, and oxidation resistance of super alloys in the rim section where high strength, creep resistance, and oxidation resistance are needed for high temperature applications, such as for gas turbines and jet engines. Composite discs according to the invention thus provide significantly increased temperature capability over a comparable system which uses a completely steel disc, at a fraction of the cost of a solid high nickel alloy disc.

The rim section according to the invention is formed from a high nickel alloy. The high nickel alloy material for the rim is preferably an equiaxed poly-crystalline material, rather than a single crystal or directionally solidified poly-crystalline material. The term "equiaxed" as known in the art refers to the shape of the respective grains being substantially equal in all directions. As defined herein, a high nickel alloy is an alloy having at least 20% nickel. In a preferred embodiment, the rim section is formed from an alloy having the following approximate composition: 35% to 60% nickel, 12% to 25% chromium, 2% to 6% niobium, 0.5% to 3% titanium, 0% to 2% aluminum and 0% to 5% molybdenum, with the balance being iron.

In a preferred embodiment of the invention, the rim section is formed from high nickel alloy compositions which also meet the requirements of a super alloy. As known in the art, a super alloy is defined as a heat resistant alloy based on nickel, iron-nickel or cobalt that exhibits high strength and resistance to surface degradation at high temperatures. Super alloys include nickel-iron-chromium based alloys, such as IN706, IN718, or Waspalloy. These super alloys are presently used to form solid high nickel alloy discs for use in high performance gas turbines and jet engines for rotating discs where the stresses and temperatures are quite high.

Two exemplary methods are described for forming composite disks according to the invention. Referring to FIG. 1, a first method embodiment forges two materials together to form forged composite disc 100. Disc 100 includes a high nickel alloy rim section 110 and a low alloy steel bore section 115. A relatively thin intermediate layer 112 is generally disposed between the rim section 110 and bore section 115. In the case of the forging method described below, intermediate layer 112 can comprise a thin (on the order of 0.001 inches) plating layer formed from substantially pure Ni, or a forged welding enhanced agent layer about 0.5 inches thick. In the case of the welding method embodiment described below, a separate and distinct intermediate layer 112 is generally not present after the post-weld heat treatment since the completed weld joint is generally an admixture of the respective base materials (from rim section 110 and bore section 115) on either side of the joint with the welding filler metal.

Regarding the welding method, a welding filler material will generally be a high strength Iron-Nickel-Chromium austenitic super alloy material capable of dilution between the material comprising the low alloy steel bore 115 and the high nickel alloy ring 110. The welding filler metal can be selected from Alloy W (UNS N10004), Haynes Alloy 230 (UNS N06230), Alloy 718 (UNS N07718), or Alloy 909 (UNS N19907). As a result of the dilution, the completed weld joint becomes an admixture of the base material on either side of the joint with the welding filler metal.

A method to form forged composite disc 100 can comprise forging a high nickel alloy ring, such as an Inconel 718 ring (or similar high strength Nickel Iron Chromium alloy) to dimensions slightly smaller than an ingot necessary to form the bore of the final machined disc. An ingot of a low alloy steel, such as 3.5NiCrMoV listed in ASTM A471 is then manufactured. The low alloy steel ingot can have low levels of manganese, phosphorus, sulfur and other tramp elements. The outside diameter of the steel ingot is then preferably cleaned and protected with a nickel plating or other forge welding enhancing agent to aid in bonding the forgings together. The high nickel alloy ring is then placed over the low alloy steel ingot to form a composite forging preform. The composite forging preform is then forged and then heat treated. The disc is then final machined to form composite disk 100.

In another embodiment of the invention, a welding method is used to form welded composite disc 100. In this embodiment, intermediate layer 112 can be considered to not be present since the welding filler material is admixed into the material comprising the rim section 110 and bore section 115 on either side of the joint. The welding method can begin by forging a high nickel alloy ring, such as an Inconel 718 ring (or similar high strength Nickel Iron Chromium alloy) to dimensions slightly larger than the rim 110 of the final machined composite disc 100. The rim 110 is then preferably solution annealed and given the first precipitation aging heat treatment, since the steel bore section 115 may not be able to withstand the aging heat treatment. The aging heat treatment is generally a solution anneal at about 970° C. followed by aging at 730° C. and 620° C. for times commensurate with component size.

A low alloy steel, such as 3.5NiCrMoV or other low alloy steel that has high strength and high fracture toughness is then forged, austenitized and quenched. The two pieces are machined with a weld preparation as described below.

The respective pieces are joined with suitable welding filler metal such as one of the exemplary weld filler materials described above. A variety of welding processes can be used, such as submerged arc, gas tungsten arc, electron beam, and laser. The disc is then given a final heat treatment which ages the rim section material and tempers the steel bore section. The heat treatment after welding is generally of sufficiently high temperature and duration to substantially relieve the residual stresses from the welding process and reduce the hardness of (temper) the heat affected zone of the low alloy steel bore section 115, but low enough to not over-age the nickel based alloy rim 110. A temperature between about 540° C. and 650° C. will generally be appropriate for a duration on the order of magnitude of about 8 to 12 hours for the heat treatment after welding. The composite disc 100 is then generally final machined.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim:

1. A composite turbine disc comprising:
 a bore section formed from a material having a first melting point,
 a rim section comprising a high nickel alloy which provides a higher melting point as compared to said bore section, and
 an intermediate layer formed from a forged enhancement agent comprising nickel between said bore and said rim.

2. The disc of claim 1, wherein said high nickel alloy comprises a super alloy material, said super alloy material comprising 35% to 60% nickel.

3. The disc of claim 1, wherein said bore section comprises steel.

4. A method of fabricating composite turbine discs, comprising the steps of:
- forging a ring from a high nickel alloy material;
- providing a steel ingot;
- placing said ring over said steel ingot; and
- forging the ring and the steel ingot together.

5. The method of claim 4, further comprising the step of plating said ingot with a plating layer before said placing step.

6. The method of claim 5, wherein said plating layer comprises nickel.

7. The method of claim 4, wherein said high nickel alloy material comprises a super alloy, said super alloy comprising 35% to 60% nickel.

* * * * *